E. G. WOODSIDE.
Hub.
No. 70,670.
Patented Nov. 5, 1867.
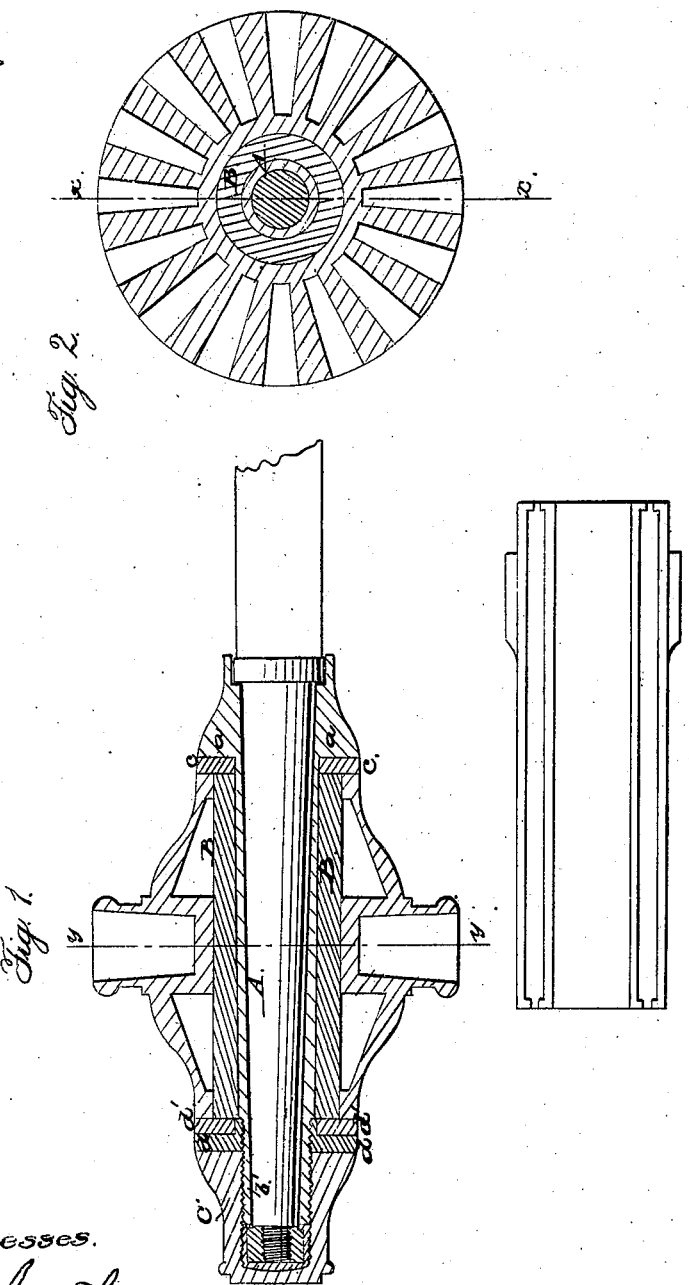

United States Patent Office.

ELBRIDGE G. WOODSIDE, OF SAN FRANCISCO, CALIFORNIA.

Letters Patent No. 70,670, dated November 5, 1867.

IMPROVEMENT IN WHEEL-HUB BOXES.

The Schedule referred to in these Letters Patent and making part of the same.

TO ALL WHOM IT MAY CONCERN:

Be it known that I, ELBRIDGE G. WOODSIDE, of San Francisco, county of San Francisco, State of California, have invented a new and improved "Wheel-Hub and Box;" and I do hereby declare the following description and accompanying drawings are sufficient to enable any person skilled in the art or science to which it most nearly appertains to make and use my said invention or improvement without further invention or experiment.

The nature of my invention is to provide a wheel-hub and box so constructed that when passing over rough places the wheel will become relieved from sudden strain and jar by reason of the elasticity imparted to it by means of the elastic or rubber packing which surrounds the box and ends of the hub.

To more fully illustrate and explain my invention, reference is had to the accompanying drawings and letters marked thereon, of which—

Figure 1 is a section taken through the line $x\,x$.

Figure 2, a section taken through $y\,y$.

The figures in red lines show the manner of construction for wood hubs.

Similar letters indicate like parts in each of the drawings.

The hub or nave of my wheel I make in the ordinary way with mortises, and it may be constructed of wood or metal. If of metal, a packing or cement composed of asphaltum and coal tar may be placed around the inner surface, between the hub and the box, which fills the space which would otherwise be formed by the hub and make it too heavy. The box A, I construct in a continuous piece, having a shoulder, $a$, at one end, and a thread, $b$, at the other end. Against this shoulder I place a rubber ring, $c$. Around the box I place a rubber ring or tube, B, completely covering it, with the exception of the thread. This ring or pipe fits closely against the ring $c$, forming a rubber shoulder against the wood or metal shoulder of the box. The hub is then placed upon the box, and a ring or nut, $d$, having a thread and India-rubber face, $d'$, is turned up against it, when the hub is ready to receive the axle, which is secured to it in the usual way by a nut, and the outer band or nut $e'$ covers the end, and is screwed up tightly against the ring $d$. By this means the axle-box is completely surrounded with rubber, and both ends of the hub are provided with a packing of the same, which greatly relieves the wheel vertically, as well as laterally, in passing over depressions in the road, or other obstacles, which have a great tendency, in the ordinary manner of constructing wheels, to so shatter or loosen the bands, spokes, and felloes as to render their use but of short duration.

My improvement may be readily applied to wheel-barrows and other vehicles, as well as to buggies and wagons, at a small cost, and commends itself to pleasure-seekers for comfort, ease, and economy in riding.

Having thus described my invention, what I claim as new, and desire to secure by Letters Patent, is—

1. Surrounding the box A with an elastic packing, B, substantially as described for the purposes set forth.

2. I also claim, in combination with the packing B, the end packings $c$ and $d'$, substantially as described for the purposes set forth.

In witness whereof I have hereunto set my hand and seal.

E. G. WOODSIDE. [L. S.]

Witnesses:
   C. W. M. SMITH,
   GUS. A. MANTLEY.